United States Patent
Stoppe et al.

(10) Patent No.: US 10,755,429 B2
(45) Date of Patent: Aug. 25, 2020

(54) APPARATUS AND METHOD FOR CAPTURING IMAGES USING LIGHTING FROM DIFFERENT LIGHTING ANGLES

(71) Applicant: Carl Zeiss Microscopy GmbH, Jena (DE)

(72) Inventors: Lars Stoppe, Jena (DE); Lars Omlor, Aalen (DE)

(73) Assignee: Carl Zeiss Microscopy GmbH, Jena (DE)

(*) Notice: Subject to any disclaimer, the term of this patent is extended or adjusted under 35 U.S.C. 154(b) by 0 days.

(21) Appl. No.: 15/572,349

(22) PCT Filed: May 13, 2016

(86) PCT No.: PCT/EP2016/060812
§ 371 (c)(1),
(2) Date: Nov. 7, 2017

(87) PCT Pub. No.: WO2016/180960
PCT Pub. Date: Nov. 17, 2016

(65) Prior Publication Data
US 2018/0122092 A1    May 3, 2018

(30) Foreign Application Priority Data
May 13, 2015  (DE) .................. 10 2015 107 517

(51) Int. Cl.
*G06T 7/586*      (2017.01)
*G06T 5/50*       (2006.01)
(Continued)

(52) U.S. Cl.
CPC .............. *G06T 7/586* (2017.01); *G02B 21/06* (2013.01); *G02B 21/367* (2013.01); *G06T 5/003* (2013.01);
(Continued)

(58) Field of Classification Search
CPC ........... G06T 7/586; G06T 5/003; G06T 5/50; G06T 2207/20041; G06T 2207/10056;
(Continued)

(56) References Cited

U.S. PATENT DOCUMENTS

| | | |
|---|---|---|
| 5,038,258 A | 8/1991 | Koch et al. |
| 5,808,291 A | 9/1998 | Nakamura |

(Continued)

FOREIGN PATENT DOCUMENTS

| | | |
|---|---|---|
| CN | 101320094 A | 12/2008 |
| CN | 101566692 A | 10/2009 |

(Continued)

OTHER PUBLICATIONS

Chamgoulov, Ravil et al., "Optical Computed-tomographic Microscope for Three-dimensional Quantitative Histology", Cellular Oncology 26, IOS Press, 2004, pp. 1-10.

(Continued)

*Primary Examiner* — Mulugeta Mengesha
*Assistant Examiner* — Alazar Tilahun
(74) *Attorney, Agent, or Firm* — Murphy, Nilak & Homiller, PLLC

(57) ABSTRACT

Methods and apparatuses in which a plurality of images are recorded at different illumination angles are provided. The plurality of images are combined in order to produce a results image with an increased depth of field.

18 Claims, 5 Drawing Sheets

(51) Int. Cl.
*G02B 21/06* (2006.01)
*G02B 21/36* (2006.01)
*G06T 5/00* (2006.01)
*G02B 21/14* (2006.01)

(52) U.S. Cl.
CPC ............ *G06T 5/50* (2013.01); *G02B 21/14* (2013.01); *G06T 2207/10056* (2013.01); *G06T 2207/10152* (2013.01); *G06T 2207/20041* (2013.01)

(58) Field of Classification Search
CPC ....... G06T 2207/10152; G06T 2200/21; G06T 2207/10052; G06T 2207/20221; G06T 2207/10016; G06T 2207/20208; G06T 2207/20216; G02B 21/367; G02B 21/06; G02B 21/14; G02B 21/002; G02B 21/365; G02B 27/58; G06K 9/00134; G21K 7/00; H04N 1/6027; H04N 5/21; H04N 5/217; H04N 5/2254; H04N 5/2256; H04N 5/23212; H04N 5/23229; H04N 5/23232; H04N 9/07
See application file for complete search history.

(56) References Cited

U.S. PATENT DOCUMENTS

| | | | |
|---|---|---|---|
| 5,939,705 | A | 8/1999 | Nakamura |
| 6,262,802 | B1 | 7/2001 | Kiyono |
| 9,068,821 | B2 | 6/2015 | Fujimoto |
| 9,679,215 | B2 | 6/2017 | Holz et al. |
| 9,702,977 | B2 | 7/2017 | Holz |
| 10,247,933 | B2 | 4/2019 | Stoppe et al. |
| 2011/0025880 | A1* | 2/2011 | Nandy ............... G01N 21/6458 348/226.1 |
| 2012/0057013 | A1 | 3/2012 | Ishiwata |
| 2012/0098950 | A1 | 4/2012 | Zheng et al. |
| 2013/0016885 | A1 | 1/2013 | Tsujimoto |
| 2013/0280752 | A1* | 10/2013 | Ozcan ............... G01N 21/4795 435/29 |
| 2013/0329120 | A1 | 12/2013 | Hiasa et al. |
| 2013/0342852 | A1 | 12/2013 | Fujimoto |
| 2014/0071313 | A1 | 3/2014 | Hiasa |
| 2014/0118529 | A1 | 5/2014 | Zheng et al. |
| 2014/0133702 | A1 | 5/2014 | Zheng et al. |
| 2014/0285818 | A1 | 9/2014 | Holz |
| 2014/0369558 | A1 | 12/2014 | Holz |
| 2015/0087902 | A1 | 3/2015 | Mertz et al. |
| 2015/0160450 | A1 | 6/2015 | Ou et al. |
| 2015/0317508 | A1 | 11/2015 | Zheng et al. |
| 2016/0110872 | A1 | 4/2016 | Wu et al. |
| 2017/0167856 | A1 | 6/2017 | Stoppe et al. |
| 2017/0261741 | A1 | 9/2017 | Stoppe et al. |
| 2017/0269344 | A1 | 9/2017 | Kato et al. |
| 2017/0270662 | A1 | 9/2017 | Kato et al. |
| 2017/0272704 | A1 | 9/2017 | Kato et al. |

FOREIGN PATENT DOCUMENTS

| | | |
|---|---|---|
| CN | 103727919 A | 4/2014 |
| CN | 103905797 A | 7/2014 |
| CN | 104541194 A | 4/2015 |
| DE | 3906555 A1 | 7/1989 |
| DE | 102004012125 B3 | 9/2005 |
| DE | 102009012248 A1 | 9/2009 |
| DE | 102011054106 A1 | 4/2013 |
| DE | 102012218863 A1 | 4/2014 |
| DE | 102014109687 A1 | 1/2016 |
| DE | 102014112242 A1 | 3/2016 |
| DE | 102014112648 A1 | 3/2016 |
| DE | 102014112666 A1 | 3/2016 |
| DE | 102014113433 A1 | 3/2016 |
| TW | 201428339 A | 7/2014 |

OTHER PUBLICATIONS

Dowski, Edward R. et al., "Extended Depth of Field Through Wave-front Coding", Applied Optics, vol. 34, No. 11, Apr. 10, 1995, pp. 1-8.

Kawata et al., "Optical Microscope Tomography. I. Support Constraint", Journal of the Optical Society of America, Jan. 1, 1987, pp. 1-6.

Zheng et al., "Wide-field, High-resolution Fourier Ptychographic Microscopy", Nature Photonics, Jul. 28, 2013, pp. 1-8.

Dong, Siyuan, et al., "Aperture-scanning Fourier Ptychography for 3D Refocusing and Super-resolution Macroscopic Imaging", Optics Express, vol. 22, No. 11, Jun. 2, 2014, 14 pages.

Dong, Siyuan, et al., "FPscope: a Field-portable High-resolution Microscope Using a Cellphone Lens", Biomedical Optics Express, vol. 5, No. 10, Oct. 1, 2014, 6 pages.

Horstmeyer, R., et al., "Diffraction Tomography with Fourier Ptychography", Department of Electrical Engineering, Institute of Technology, Pasadena, CA, UA, 22 pages.

\* cited by examiner

APPARATUS AND METHOD FOR CAPTURING IMAGES USING LIGHTING FROM DIFFERENT LIGHTING ANGLES

TECHNICAL FIELD

The present application relates to apparatuses and methods for recording images. In particular, it relates to those apparatuses and methods in which recording images with an increased depth of field is possible.

BACKGROUND

A high depth of field is desirable in various applications in which, in particular, three-dimensional objects are recorded by means of an image recording apparatus, for example in order to be able to image a desired region or the entire recorded object in focus in a two-dimensional image. Here, the depth of field is generally understood to mean a region in which an object is imaged sufficiently in focus, for example in accordance with a resolution of a recording medium such as an image sensor.

The numerical aperture can be reduced in conventional systems for the purposes of increasing the depth of field. However, this leads to a reduction in the resolution and/or in the available light at the same time.

The use of specific pupils and field filters provides a further option for increasing the depth of field of an apparatus for recording images. Examples of this are described in Edward R. Dowski, Jr., and W. Thomas Cathey, "Extended Depth of field through wave-front coding", Applied Optics, Vol. 34, No. 11, 1859-1866, 1995. As a rule, such approaches are disadvantageous in that they significantly reduce the contrast at higher spatial frequencies, possibly leading to a loss of resolution on account of noise. Furthermore, artifacts may be formed during digital post-processing that is required in this case. Moreover, a specific optics design is necessary, in which the pupil plane/intermediate image plane is accessible and optically corrected, leading to increased costs of the apparatus.

A third conventional option for producing an image with an increased depth of field lies in a digital calculation of such an image from a so-called z-stack measurement. This approach is also referred to as "focus stacking". In this approach, a plurality of images are recorded with different foci (for example by displacing the sample or by a different modification of the apparatus, for example by changing the focusing of an optical system). Then, the respective sharpest region of each image is transferred into the overall image by means of suitable algorithms. Here, it is possible to produce an image which has a virtually arbitrary depth of field, without this yielding a loss of resolution. A disadvantage of this approach is that the aforementioned z-stack, also referred to as defocus stack, needs to be produced by mechanical displacement of a component of the apparatus (for example displacing lenses for changing the focus and/or displacing the sample), which may take a relatively long period of time, may be comparatively high cost and/or may introduce unwanted movements of the sample when displacing the sample.

It is therefore an object to provide methods and apparatuses by means of which the above-described disadvantages can be at least partly overcome or reduced and by means of which it is possible to record images with an increased depth of field compared to conventional single image recording.

SUMMARY

According to a first aspect, provision is made of a method for image recording, said method comprising the following steps:
recording a plurality of images, wherein, for the purposes of recording the plurality of images, an object is illuminated at illumination angles which differ between the images, and
processing the plurality of images, wherein processing comprises:
applying operations to the plurality of images and combining the plurality of images with the operations applied thereto in order to obtain a results image with an increased depth of field.

Applying operations may comprise applying a displacement to image elements of the images.

By using images that were recorded with different illumination directions for the purposes of producing an image with an increased depth of field, it is possible to avoid or—in the case of very large desired depth-of-field ranges—reduce a mechanical displacement for setting a focus.

The displacement may depend on the illumination angle of the respective image and on a position in a direction parallel to the optical axis of a part of the object corresponding to the respective image element.

Applying operations may comprise applying operations for a plurality of positions in a direction parallel to an optical axis and choosing image parts for the results image which display the greatest sharpness for a measure of sharpness, for the results image.

Here, the measure of sharpness can be determined on the basis of a local variance.

Processing may comprise:
running through a loop, in which a position parameter runs over a desired position range parallel to an optical axis of an apparatus used for recording images, and, for each position parameter of the loop:
determining an intermediate image as a sum over the plurality of images, on which a displacement that was applied by the respective height parameter and the respective illumination angle was applied as operation,
forming a local variance value for each image element of the intermediate image, and
including those image elements of the intermediate image in a results image in which the local variance is greater than a local variance of the preceding loop run-throughs.

The method may further comprise creating a height map on the basis of the plurality of images.

Processing may comprise stitching.

Processing may comprise applying an image correction.

The results image may comprise a phase contrast image.

According to a second aspect, provision is made of an apparatus for recording images, comprising:
an illumination device that is actuatable to set a plurality of different illumination angles for illuminating an object,
an image recording device which is configured to record a plurality of images of the object, wherein the illumination angles differ for different ones of the plurality of images, and
an evaluation device for processing the plurality of images, wherein the evaluation device is configured to apply an operation to each image of the plurality of images and combine the images with the operations applied thereto in order to produce a results image with an increased depth of field.

The apparatus may be configured to carry out one of the above-described methods.

BRIEF DESCRIPTION OF THE DRAWINGS

Below, various embodiments are explained in more detail with reference to the attached drawings. In detail.

DETAILED DESCRIPTION

Figure 1:
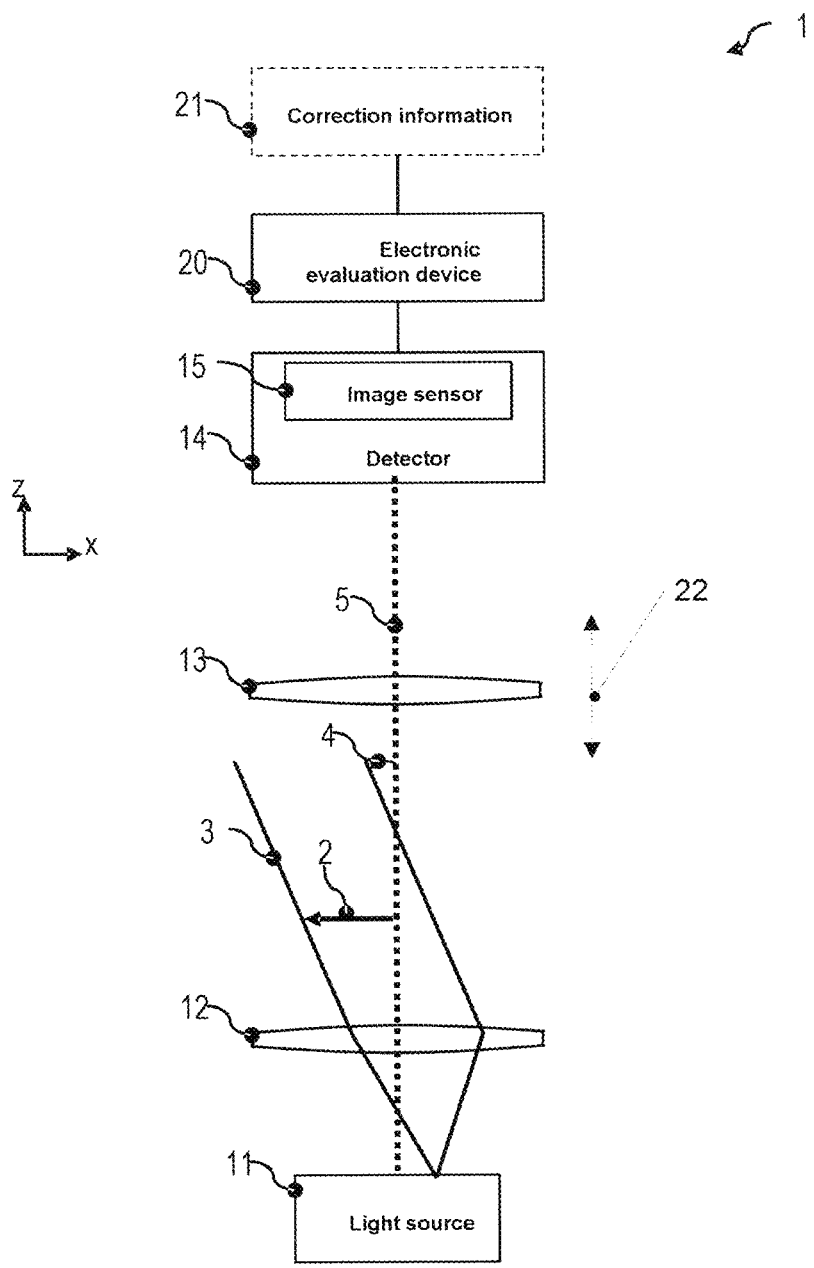
FIG. 1 shows a schematic illustration of an apparatus according to an embodiment.

In the figures, the same reference signs denote the same or similar elements. The figures are schematic illustrations of various embodiments of the invention. Elements illustrated in the figures are not necessarily illustrated true to scale. Rather, the various elements illustrated in the figures are reproduced in such a way that the function and purpose thereof is rendered understandable to a person skilled in the art.

While embodiments are described with a plurality of features or elements, this should not be construed as all of these features or elements being required for implementing the respective embodiment. Rather, some of the illustrated elements or features can be omitted and/or replaced by alternative features or elements in other embodiments. Moreover, or alternatively, additional features or elements that are not explicitly illustrated or described, for example conventional optical components, may be provided in addition to the illustrated features or elements. Features or elements of various embodiments can be combined with one another provided that nothing else is specified.

Techniques with which recording images with an increased depth of field is possible are described below. To this end, use is made, in particular, of a plurality of image recordings with various illumination angles. Here, the illumination angles can differ in respect of the absolute value and/or the direction. In this context, an increased depth of field means, in particular, that the depth of field is greater than the depth of field of a single image recording. Optionally, additional aberrations that are caused by defocusing may also be corrected by calculation in the process. Here, a correction and correcting aberrations are understood to mean measures by means of which the quality of a produced results image can be improved and at least certain aberrations, such as defocusing aberrations caused by image field curvature and/or astigmatism, can be reduced.

As will be described in more detail below, a plurality of images of an object are recorded in sequence in embodiments. An illumination angle for illuminating the object is set to different values for recording the plurality of images. Here, a focus setting of an employed apparatus may remain unchanged for recording the plurality of images, and so no mechanical movement of components is necessary. An operation is applied to at least some of the images, in particular a displacement of image elements (e.g. pixels). The displacement can be dependent on the respective illumination direction and dependent on an orientation of an object imaged on the respective image element partly in the z-direction, with the z-direction substantially denoting a direction parallel to an optical axis of a recording apparatus (for example a microscope objective or the like). The images modified thus by the operation can be combined with one another in order to produce an image with an increased depth of field. Additionally, a correction of aberrations may be undertaken by means of the operation, as explained above.

FIG. 1 is a schematic illustration of an image recording apparatus 1 according to an embodiment. The image recording apparatus of FIG. 1 can be configured for automatically carrying out methods according to various embodiments, for example the methods explained below with reference to FIGS. 2 and 3. The image recording apparatus 1 may be a microscope system, or may comprise a microscope, which is provided with a controllable illumination device that will still be explained in more detail below, a camera with an image sensor, and an electronic evaluation device for producing images with an increased depth of field and optionally also for correcting images.

The image recording apparatus 1 comprises an illumination device having a light source 11. Provision is made of a condenser lens 12 in order to steer the light emitted by the light source 11 onto an object 2 to be imaged. The illumination device is configured in such a way that light can be radiated onto the object 2 at a plurality of different illumination angles 4. To this end, the light source 11 can comprise e.g. an arrangement of a plurality of light source elements, for example light-emitting diodes, which may be individually actuatable. By way of example, such light source elements can be arranged in a ring-shaped manner. Alternatively, a controllable element can be arranged in an intermediate image plane, in which a conventional light source is imaged in a magnified manner, in order to provide different illumination angles. The controllable element may comprise a movable pinhole aperture, a micromirror arrangement, a liquid crystal matrix or a spatial light modulator.

The illumination device can be configured in such a way that the absolute value of the illumination angle 4, which is included with an optical axis 5, can be modified. Additionally, or alternatively, the illumination device can be configured in such a way that the illumination angle can be modified in terms of the direction, i.e. a direction of the beam 3 with which the object can be illuminated at an illumination angle 4 can be moved around the optical axis 5 in the polar direction. As a consequence, a modifiable illumination angle should be understood to mean an illumination angle which is modifiable in respect of the absolute value and/or in respect of the direction.

A detector 14 of the image recording apparatus 1 is configured to capture at least one image of the object 2 in each case for each of a plurality of different illumination angles at which the object 2 is illuminated. By way of example, an image sensor 15 of the detector 14 can be configured as a CCD sensor, CMOS sensor, or as a TDI ("time delay integration") CCD sensor. An imaging optical unit, for example a microscope objective 13, only illustrated schematically, of a microscope arrangement, can produce an image of the object 2, in particular a magnified image as well, on the image sensor 15. The image sensor 15 may comprise a plane area for recording images.

The image recording apparatus 1 further comprises an electronic evaluation device 20. The electronic evaluation device 20 further processes the plurality of images of the object that were captured for the plurality of illumination angles 4. By way of example, the electronic evaluation device 20 can be implemented by appropriate programming of a computer apparatus with one or more processors. However, use can also be made of special hardware implementations, for example application-specific integrated circuits (ASICs). In particular, the electronic evaluation device 20 applies operations to the images and then combines the images in order to obtain a results image with an increased depth of field. In particular, the operations may comprise a displacement of image elements (pixels), wherein the displacement may depend on the illumination angle and on the orientation of the part of the object, which was imaged on the respective image element, in the z-direction. Moreover, a field-point-dependent offset, which is caused by image field curvature or astigmatism or any other field-point-dependent defocusing error, optionally may be reduced by such an operation or displacement. For the purposes of such a correction, a field-point-dependent displacement, with which the respective image element is displaced in the image plane, may be set dependent upon field-point-dependent defocusing. Correction values for carrying out such corrections may be stored in a storage medium 21 as correction information. By way of example, details of such corrections of aberrations are described in the German patent application DE 10 2014 112 666 A1. The methods for increasing the depth of field described in more detail below may be combined with these corrections, but they can also be applied in their own right.

Figure 2:
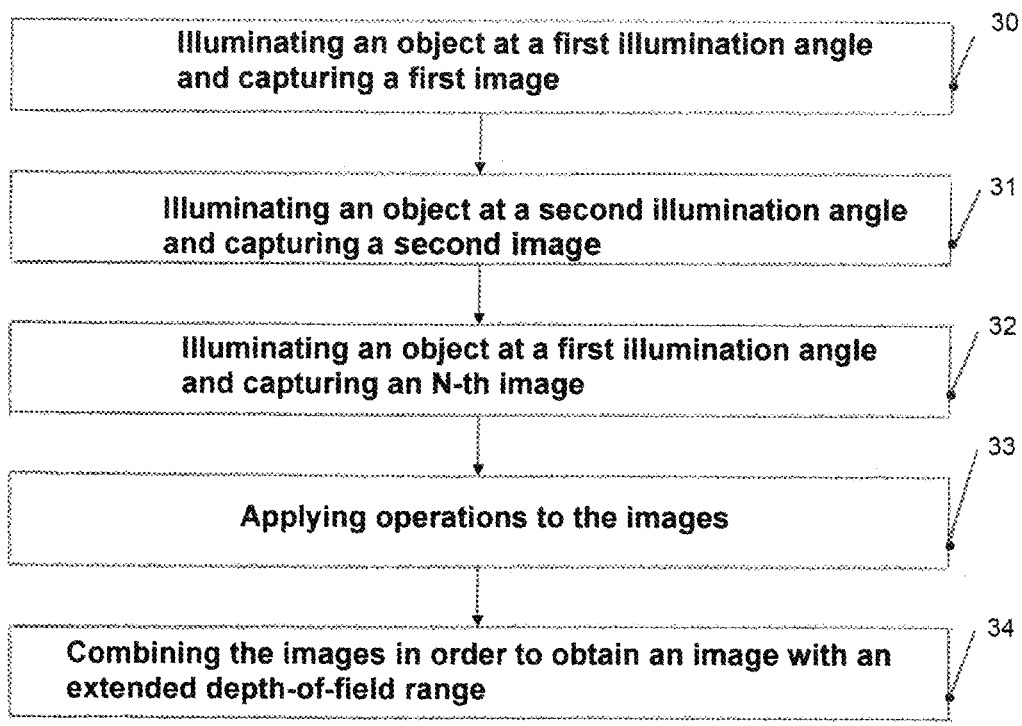
FIG. 2 shows a flowchart for elucidating a method according to an embodiment.

FIG. 2 illustrates a method for recording images according to an embodiment. The method of FIG. 2 can be carried out, for example, by means of the apparatus in FIG. 1, but it can also be used independently thereof.

In step 31, an object to be recorded is illuminated at a first illumination angle. By way of example, if use is made of the apparatus in FIG. 1, the illumination device can be actuated by the electronic evaluation device 20 in such a way that the object is illuminated at the first illumination angle. Moreover, a first image is captured in step 31, for example by the image sensor 15 in FIG. 1.

In step 31, the object is illuminated at a second illumination angle which differs from the first illumination angle in respect of the absolute value and/or the direction. To this end, an employed illumination device may be appropriately actuated once again. Moreover, an appropriate second image is captured, for example by the image sensor 15.

This can be repeated at different illumination angles until, at step 32, the object is illuminated at an N-th illumination angle and an N-th image is recorded. Here, N may be greater than 2, for example lie between 10 and 40.

In step 33, a respective operation is applied to each, or at least to a part, of the N images, wherein the operations may also comprise a plurality of partial operations for each image. In particular, the operations may comprise displacements of image elements (pixels), wherein an absolute value and/or a direction of the displacement may depend, firstly, on the employed illumination angle, i.e. may vary from image to image, and may depend, secondly, on a z-coordinate of an imaged object, wherein the z-direction may be the direction perpendicular to the image plane or parallel to the optical axis 5, as illustrated in FIG. 1. In step 34, the images which had the operations applied thereto in step 33 are combined, for example summed, in order to obtain an image with an increased depth-of-field range. As already explained, the operations at 33 may additionally serve to correct aberrations. The application of the operations at 33 and the combination of the images at 34 need not be carried out in the illustrated sequence but may also be interwoven such that, for example, the operations are applied and the images are combined for different parts of the images.

Figure 3:
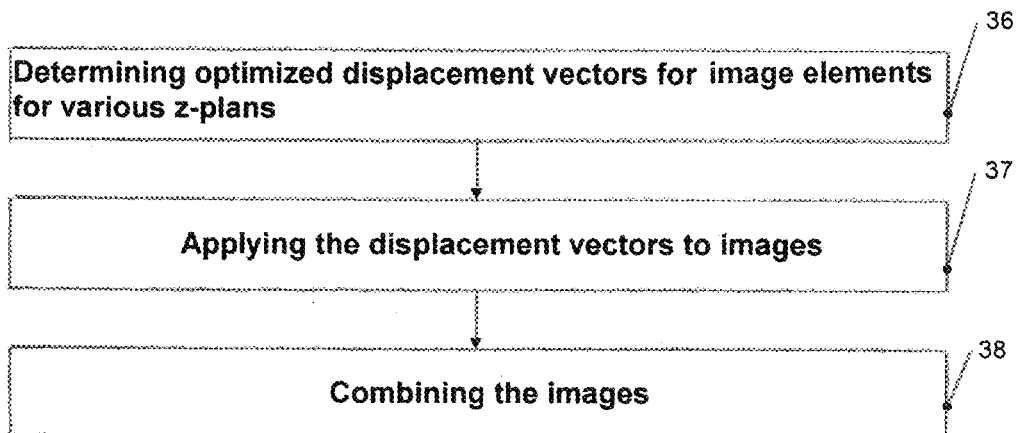
FIG. 3 shows a flowchart for elucidating a method according to a further embodiment.

FIG. 3 illustrates a method according to an embodiment which, in particular, represents an example for steps 33 and 34 in FIG. 2.

Optimized displacement vectors for image elements for various z-planes and various illumination directions are determined at 36. These optimized displacement vectors then can also be stored for subsequent use for further image recordings, for example in the memory 21 in FIG. 1. At 37, the displacement vectors are applied to the images. Finally, the images are combined at 38 in order to obtain an image with an increased depth of field.

Below, the application of operations on the images and the combination of the images for increasing the depth of field are explained in even more detail. The basis for producing images with an increased depth of field according to some embodiments is the discovery that the location at which respective parts of an object to be recorded are imaged on the image sensor depends on the illumination direction in the defocused case in the case of an illumination at different illumination angles as described above. Expressed differently, parts of the object to be recorded which lie in a focal plane of the optical arrangement (for example in a focal plane of the microscope objective 13 in FIG. 1) are always captured at the same location of the image sensor 15, independently of the illumination angle. For parts of the object that lie outside of the focal plane, the imaging on the image sensor 15, however, is displaced from illumination angle to illumination angle, with the magnitude of the displacement depending on how far the respective part of the object lies outside of the focal plane or, expressed differently, depending on the z-position of the respective part of the object.

On this basis, an appropriate displacement may be determined, for example in the case of some embodiments, for each illumination direction and each z-position, said displacement being applied, for example, to image elements (pixels) of the image. In particular, this displacement can be selected in such a way that the offset between different illumination directions is compensated. If the images processed thus are then summed, an image with an increased depth of field arises.

What should be observed is that such an approach allows the depth of field to be extendable to a range corresponding to the coherent depth of field of an employed apparatus. If an even higher depth of field is required, it is additionally possible to modify the focus of the apparatus (for example as indicated by an arrow 22 in FIG. 1). Then, compared to conventional focus stacking, a movement of the focus into fewer different positions is necessary here. By way of example, an increment substantially corresponding to the coherent depth of field may be selected. Then, the images produced using the method discussed above can be used as the initial basis for the focus stacking, said images being in focus over a respective coherent depth-of-field range.

The basic principle explained above can be applied in various ways in order to produce an image with an increased depth of field.

In one approach, a z-stack with various focal planes is "simulated", i.e. calculated on the basis of the images recorded at different illumination angles. Then, this z-stack can be combined by calculation to form an image with an increased depth-of-field range using conventional algorithms that are known for z-stacks. By way of example, a successive displacement as an operation can be applied to the individual images, with each displacement then corresponding to a different z-value. Then, the displacement value can be used for each image element and it is possible to store the one in which the image around the respective image element is "most in focus". By way of example, a local variance can be used as a criterion to this end. By way of example, other possible criteria are local edge slopes, local image sharpness measures and similar measures, as also are used, for example, for setting an autofocus in photography.

Illustrated below is a pseudocode which elucidates how such a production of an image with an increased depth of field can be carried out.

```
EDof = zeros(n);
Zmap = zeros(n);
BestVariance = zeros(n);
For z = z_min : z_max
        Image = Sum( [ Shift ] _((z,φ) )(IndividualImages));
        LocalExpectionValue = Filter(Image,local AveragingFilter);
        LocalVariance   =   Filter(  (Image   −
LocalExpectionValue).^2   ,   local AveragingFilter);
        Indicies = (LocalVariance > BestVariance);
        BestVariance(Indicies) = LocalVariance(Indicies);
        EDoF(Indicies) = Image(Indicies);
        Zmap(Indicies) = z;
end
```

Initially, the variables EDof, Zmap and BestVariance are initialized to zero. By way of example, these variables are two-dimensional matrices, wherein an element of the matrix is provided for each image element (or for each color channel of each image element in other embodiments).

This is followed by a loop, which lets a variable z, which a z-coordinate (corresponding to the definition of the z-direction of FIG. 1), run from a minimum value z_min to a maximum value z_max. Here, z_min and z_max lie within the already mentioned coherent depth of field of the system, but need not exploit this completely. Rather, it is possible to process only a portion if only this portion is of interest in a certain case.

Then, an image is calculated as a sum of individual images for each z-value in the loop, wherein the image elements of the respective individual images are displaced by an absolute value (shift) which depends on the z-value z and the respective illumination angle φ of the respective individual image. Then, a local expectation value is determined for each image element by applying a local averaging filter (which, for example, can average over a certain range of image elements, for example of the order of 3×3 image elements). Then, a local variance for each image element is determined on the basis of this local expectation value by virtue of squaring the difference between the image and the respective local expectation value (for each image element) and, thereupon, the local averaging filter being applied once again. Thus, the variables LocalExpectionValue and LocalVariance are matrices with an element for each image element (or each color channel of each image element). This local variance represents a measure for the sharpness. Then, all indices, i.e. all image elements, for which the local variance is greater than the (previously) best variance are determined. Expressed differently, here, those image elements in which the sharpness produced during the current iteration of the z-loop is better than sharpness values produced in preceding loops are determined, respectively according to the measure of the local variance.

Then, the best variance is set to the local variance of the respective iteration for these indices, i.e. these image elements. The final image EDof is then updated for the indices determined thus on the image elements of the respective image (variable image) such that, after the complete run through of the z-loop, the image EDof only consists of the respective "best" image elements. Optionally, the variable Zmap can also be set accordingly to the respective z-value such that, after running through the loop, Zmap represents a map of the z-values for the image elements of the image, wherein the z-value for each image element then is the value at which the local variance, i.e. the parameter used for determining the sharpness, is greatest.

In the method represented by the pseudo-program code, the displacements depending on z and φ can be obtained in advance, e.g. by a calibration, and stored. In other approaches, it is possible also to find the ideal displacement vector for each image element by, for example, playing through different displacement vectors. As already mentioned, the displacements additionally can be used to correct aberrations.

Other approaches also can be used. By way of example, the individual images can be segmented by means of local stitching methods and an automatic "defocus" search can be carried out in each portion (segment), i.e. an automated "defocus" search can be carried out for each portion. Here, the individual images, i.e. the images illuminated at the various illumination angles, in the respective segments are displaced in such a way that mutually corresponding structures in the segments are overlaid to the best possible extent. Similar methods are described, for example, in the German patent application DE 10 2014 109 687 A1 for the purposes of setting an autofocus. By way of example, such a defocus search can be carried out by means of a local correlation with an SSIM ("structural similarity") evaluation. It is not only a defocus that is corrected in the case of such an approach, i.e. it is not only an optimized sharpness that is obtained for each segment, but it is also possible to correct other defocus-dependent aberrations.

In yet another approach, a 3-D map of the sample is calculated first, substantially in accordance with Zmap in the pseudocode explained above. Such a 3-D map can be substantially determined on the basis of, depending on the z-coordinate and as already explained above, the image region experiencing various displacements depending on the illumination angle such that the z-coordinate can be deduced from the displacement. By way of example, such methods are described in more detail in DE 10 2014 109 687 A1 or DE 10 2014 113 433 A1. In the case of such methods, it is possible to determine, for example, the offset of the same structures from one another for the various illumination angles, for example by way of image recognition methods, and the z-coordinate can be determined depending on this offset, for example on the basis of a preceding calibration. The image with an extended depth of field then can be described on the basis of the 3-D map of the sample in accordance with a field-dependent defocus correction with corresponding displacements of image elements for each z-plane, similar to a defocus correction as is described, for example, in DE 10 2014 112 666 A1 or in DE 10 2014 112 648 A1 (there for the purposes of correcting aberrations).

What should be observed is that the techniques described herein are applicable not only to conventional images. Rather, they can also be applied to phase contrast images which may likewise be produced by an illumination at different illumination angles. By way of example, DE 10 2014 112 242 A1 describes how phase contrast images can be produced by an illumination at different illumination angles, in particular different illumination directions. Here, for example, two illumination directions always can provide a pair and intensity images (i.e. conventional images) can be combined from two or three or arbitrary many illumination directions, wherein the illumination directions include different angles with the optical axis.

Figure 4:
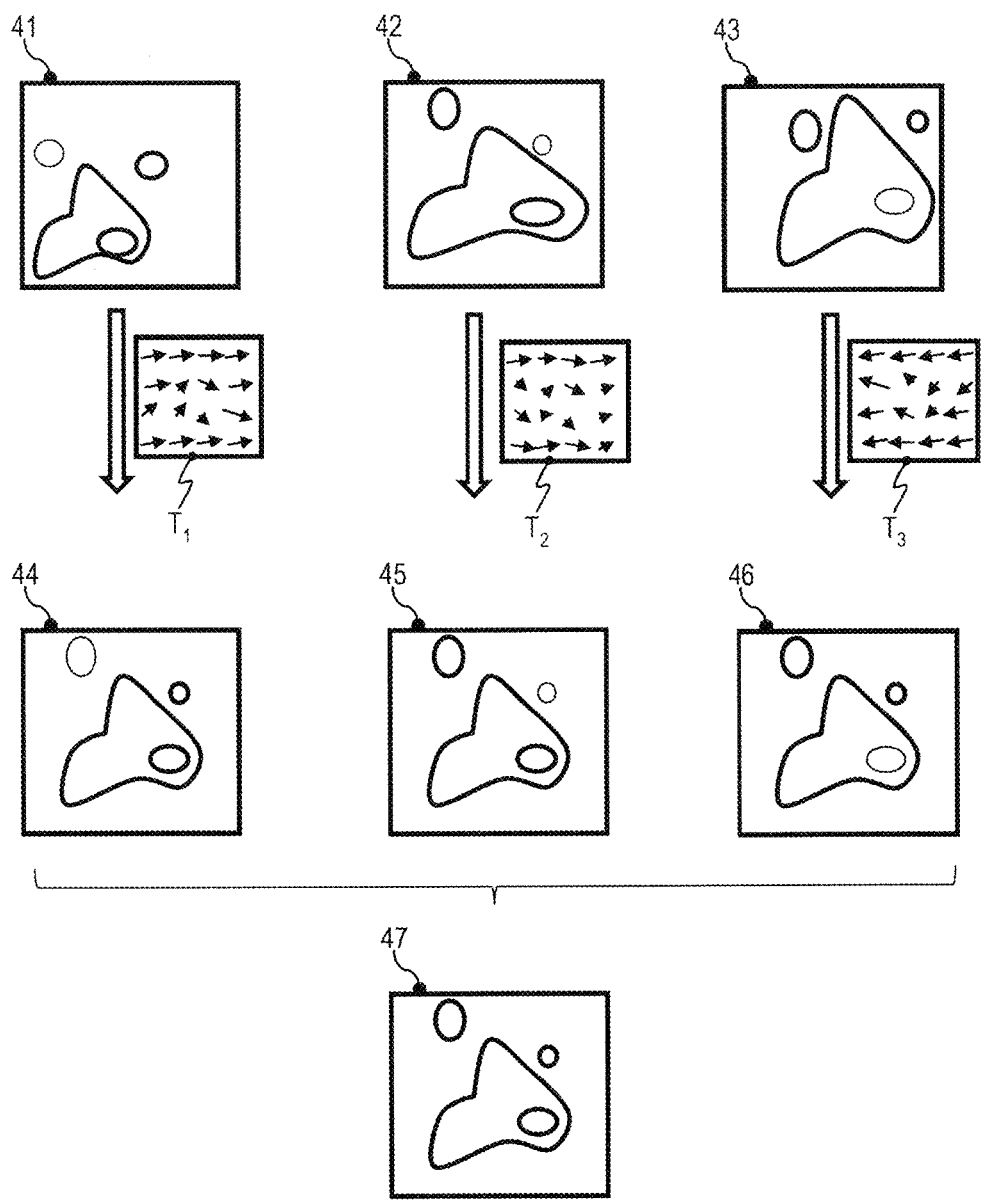
FIG. 4 shows a diagram for elucidating some embodiments.

For elucidation purposes, the applied principles are once again illustrated schematically in FIG. 4. In the simplified schematic illustration of FIG. 4, three images 41, 42 and 43 are recorded at different illumination angles. As may be seen, various parts of the object appear displaced in relation to one another, in particular parts lying outside of a focus, which is due to the different illumination directions.

Different operations T1 to T3 are applied to the images, wherein the displacement applied to a respective image element depends firstly on the z-coordinate and secondly on the illumination direction, as explained above. This leads to corresponding images 44-46, in which mutually corresponding parts are at substantially the same location. By combining, for example summing, these images, it is then possible to produce an image 47 with an increased depth of field, wherein aberrations can be corrected at the same time. As already explained above, the illustrated procedure can also be carried out together in a shifted or nested manner, for example like in the pseudocode above, where the sums of images, to which the displacement operations were applied, are formed successively for various z-coordinates and the "most in focus" parts are taken into the final image in each case. In other embodiments, it is also possible to use different metrics than the aforementioned pseudocode.

Figure 5A:
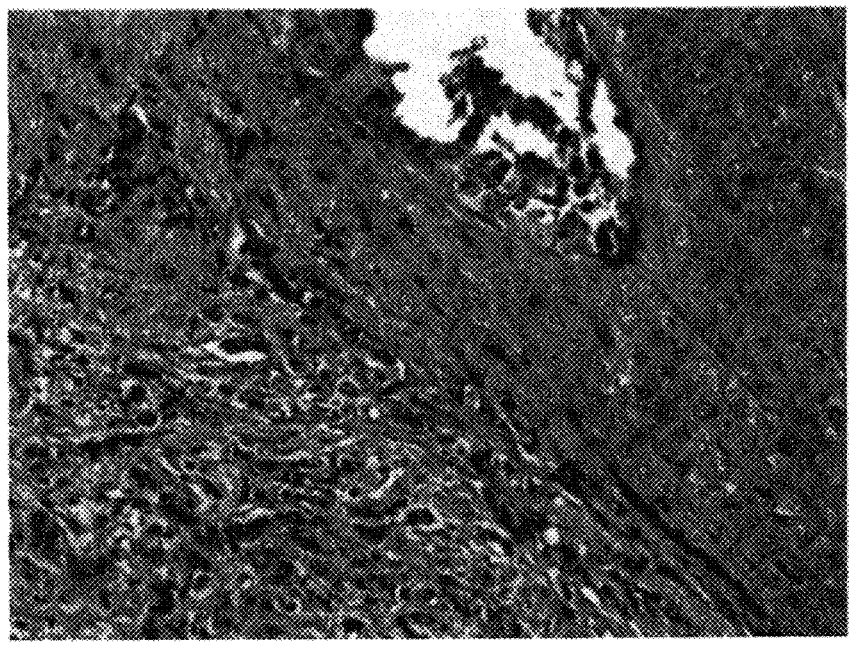
FIGS. 5A and 5B show examples for an image without and with the application of a method according to an embodiment.
Figure 5B:
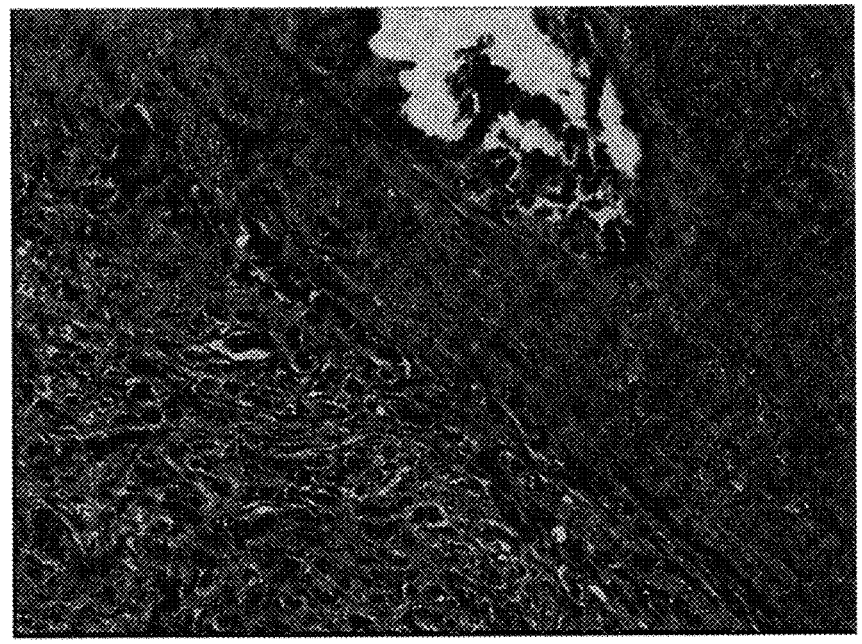

For elucidating the effect of the described methods and apparatuses, FIG. 5A shows an individual image which was recorded, for example, at an illumination angle. FIG. 5B shows a results image produced using a method according to an embodiment, in which the depth of field was increased. As may be seen, many of the structures can be identified significantly more in focus than in the image of FIG. 5A.

Now, the functionality of the embodiments described above are still explained with reference to FIG. 6, i.e. there is a presentation as to why the illustrated and explained embodiments can be used, indeed, to increase the depth of field. Expressed differently, the cause of the effects that have already been described above are explained with reference to FIG. 6.

Figure 6:
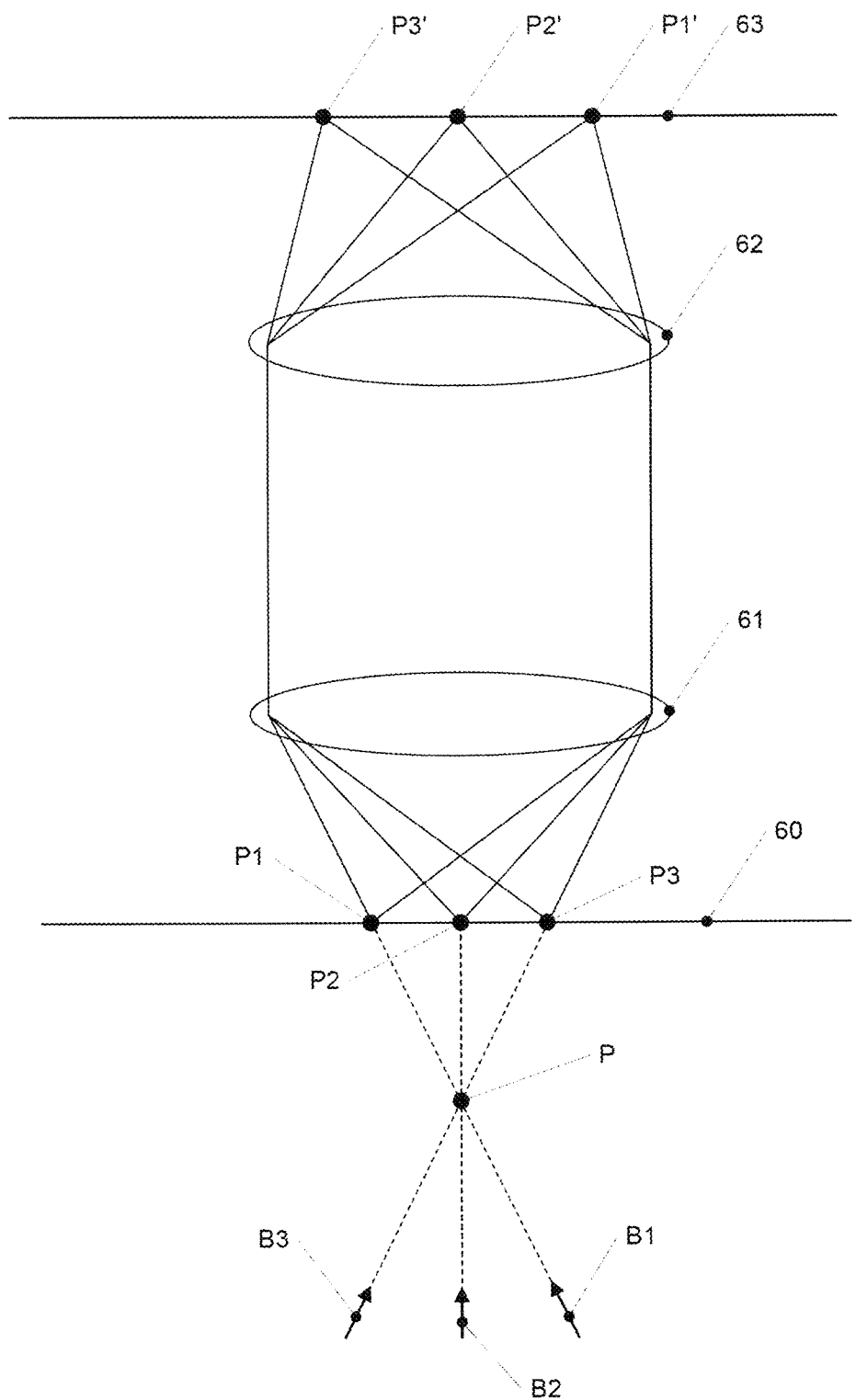
FIG. 6 shows a diagram for elucidating the functionality of embodiments.

As an example, FIG. 6 shows a simple optical system with two lenses 61, 62. Points P1 to P3 in a focal plane 60 of the optical system 61, 62 are imaged on points P1' to P3' in an image plane 63, in which e.g. a camera is situated.

For the purposes of a further explanation, a point P which, as illustrated, lies outside of the focal plane 60 and which is illuminated in succession from three different directions B1, B2 and B3, is assumed as an object for reasons of simplicity. In the case of an illumination from the illumination direction B1, light from the point P reaches the focal plane substantially at the point P1 (apart from scattering where applicable) and said light, in accordance with the laws of geometrical optics, is imaged onto the point P1'. In the case of the illumination direction B2, light from the point P reaches the focal plane at the point P2 and is accordingly imaged onto the point P2'. In the case of the illumination direction B3, light from the point P reaches the focal plane at the point P3 and is imaged onto the point P3'.

Thus, an illumination from different illumination angles (B1, B2, B3) brings about a displacement of the point P in the image plane (P1', P2' and P3'), as already explained above. As a result of the displacements of the images recorded in each case (e.g. in the image plane 63), as already described above, it then is possible to overlay the points again.

Additionally, what should be observed is that, in the case of a non-directed illumination, i.e. an illumination that is not effectuated at a specific illumination angle, the point P is imaged onto P1' and also P2' and also P3' and also on intermediate points, which is the conventional unsharp imaging for objects lying outside of the focal plane 60. The displacement of the image plane therefore is precisely due to there not being arbitrary illumination but illumination at certain angles, as already described above.

As a consequence, there is precisely not an extended unsharpness range as a result of the directed illumination at different illumination angles; instead, an object such as the point P in the example is imaged onto different positions in the image plane depending on the illumination angle. Here, the individual images are substantially in focus. However, as likewise identifiable from FIG. 6, only a small part of the aperture of the optical apparatus is used for each illumination direction, leading to a reduction in the resolution. By displacing and combining the various images, as described above, this disadvantage is rectified again since a plurality of illumination directions are combined, and hence at least a larger part of the overall aperture is used.

The illustrated embodiments offer various advantages over conventional methods and apparatuses for recording images with an increased depth of field. By way of example, the measurement can be faster than a conventional z-stack since no mechanical setting of the focus is possible. In certain circumstances, the number of required measurements is also lower than in conventional methods. Depending on the available computational power, the results image with increased depth of field can be created more quickly.

Moreover, as already explained, other aberrations can also be corrected at the same time, for example a defocus, an astigmatism, an image field curvature and a chromatic longitudinal aberration, wherein this may also be effectuated in a field-dependent manner.

Within the coherent depth of field of the employed apparatus, the image with increased depth of field can be effectuated without loss of resolution (to a restricted extent should aberrations also be corrected). As already explained earlier, the illustrated techniques for the purposes of producing a results image with an increased depth of field can be applied, moreover, to phase-contrast images which can be produced digitally at the same time. The techniques can also be carried out offline. By way of example, this means that the evaluation device 20 of FIG. 1 also can be provided separately from the remainder of the apparatus provided that it can be appropriately supplied with the images. A z-map can be created at the same time as the calculation of the results image, for example like in the pseudocode discussed above. The illustrated methods and apparatuses are easily combinable with various other methods and apparatuses.

It is possible to additionally modify the focus if a greater depth-of-field range than the coherent depth of field of the corresponding apparatus is required, with fewer focal changes being required here than in the case of a conventional z-stack.

The embodiments discussed above only serve for elucidation purposes and should not be construed as restrictive.

The invention claimed is:

1. A method of operation performed by an image recording apparatus, the method comprising:
    recording a plurality of individual images of an object via
       an image sensor of the image recording apparatus, with a focal plane of the image recording apparatus at a fixed position along an optical axis of the image recording apparatus, and with the object fixed relative to the focal plane and illuminated from a different illumination angle for each individual image, and where each individual image comprises an array of pixel values corresponding to respective pixel positions in an image plane defined by the image sensor;

generating a final image having an increased depth of field relative to the individual images, by:
for each displacement value in a set of displacement values representing displacements along the optical axis relative to the focal plane:
forming a shifted individual image from each individual image, by shifting the individual image in the image plane by a displacement vector that is expressed in pixel positions and depends on the displacement value and the associated illumination angle; and
forming an intermediate image corresponding to the displacement value by, for each pixel position in the image plane, combining the pixel values of the shifted individual images for that pixel position; and
forming the final image based on the intermediate images.

2. The method of claim 1, wherein the method includes calculating a sharpness measure for each pixel position in the intermediate images, and wherein forming the final image based on the intermediate images comprises choosing, for each pixel position, a sharpest pixel value for that pixel position, as selected from among the intermediate images according to the corresponding sharpness measures.

3. The method of claim 1, wherein the method includes calculating a sharpness measure for each pixel position in the intermediate images, and wherein forming the final image based on the intermediate images comprises forming the final image by using the sharpness measures to determine sharpest pixel values from among the intermediate images, on a per pixel position or per image region basis, and forming the final image as said sharpest pixel values.

4. The method of claim 1, wherein the method includes calculating a sharpness measure for each pixel value in each intermediate image by applying an averaging filter to a set of pixel values that includes the pixel value being evaluated and the pixel value corresponding to each of one or more surrounding pixel positions relative to the pixel position of the pixel value being evaluated, and determining a variance between the pixel value being evaluated and an averaged value produced by the averaging filter, and wherein forming the final image based on the intermediate images comprises forming the final image from sharpest ones of the pixel values among the intermediate images, as determined from the sharpness measures.

5. The method of claim 4, wherein the sharpness measures are relatively higher for pixel values in each intermediate image, for pixel positions corresponding to portions of the object that would be in focus were the focal plane positioned at the displacement value corresponding to the intermediate image, and wherein the sharpness measures are relatively lower for pixel values in each intermediate image, for pixel positions corresponding to portions of the object that would be out of focus were the focal plane positioned at the displacement value corresponding to the intermediate image.

6. The method of claim 1, wherein each displacement vector compensates for a shift within the image plane that would be observed for an imaged object that was offset from the focal plane along the optical axis by the displacement value and illuminated using the associated illumination angle.

7. The method of claim 1, further comprising generating a height map for the object, based on using the sharpness measures of the intermediate images to estimate corresponding heights of different parts of the object.

8. The method of claim 1, wherein the set of displacement values represents an interval along the optical axis that corresponds to a desired depth of field for the final image.

9. The method of claim 1, wherein the fixed position of the focal plane along the optical axis of the image recording apparatus is one among a plurality of fixed positions corresponding to different foci of the image recording apparatus, and wherein the method includes recording a corresponding plurality of individual images for each foci, such that the image recording apparatus obtains a set of intermediate images for each foci using a corresponding set of displacement values relative to the fixed position of the focal plane for each foci, and obtains the final image based on the sets of intermediate images.

10. An image recording apparatus comprising:
a detector comprising an image sensor configured for recording images of an object;
an illumination device configured for illuminating the object from different illumination angles; and
processing circuitry operatively associated with the detector and the illumination device and configured to:
record a plurality of individual images of the object via the image sensor, with a focal plane of the image recording apparatus at a fixed position along an optical axis of the image recording apparatus, and with the object fixed relative to the focal plane and illuminated from a different illumination angle for each individual image, and where each individual image comprises an array of pixel values corresponding to respective pixel positions in an image plane defined by the image sensor;
generate a final image having an increased depth of field relative to the individual images, by:
for each displacement value in a set of displacement values representing displacements along the optical axis relative to the focal plane:
forming a shifted individual image from each individual image, by shifting the individual image in the image plane by a displacement vector that is expressed in pixel positions and depends on the displacement value and the associated illumination angle; and
forming an intermediate image corresponding to the displacement value by, for each pixel position in the image plane, combining the pixel values of the shifted individual images for that pixel position; and
form the final image based on the intermediate images.

11. The image recording apparatus of claim 10, wherein, to form the final image based on the intermediate images, the processing circuitry is configured to choose, for each pixel position, a sharpest pixel value for that pixel position, as selected from among the intermediate images according to corresponding sharpness measures calculated for each pixel value in each intermediate image.

12. The image recording apparatus of claim 10, wherein, to form the final image based on the intermediate images, the processing circuitry is configured to use sharpness measures as calculated for each pixel value in each intermediate image, to determine sharpest pixel values from among the intermediate images, on a per pixel position or per image region basis, and form the final image as said sharpest pixel values.

13. The image recording apparatus of claim 10, wherein the processing circuitry is configured to calculate a sharpness measure for each pixel value in each intermediate image, based on the processing circuitry being configured to apply an averaging filter to a set of pixel values that includes the pixel value being evaluated and the pixel value corresponding to each of one or more surrounding pixel positions relative to the pixel position of the pixel value being evaluated, and determine a variance between the pixel value being evaluated and an averaged value produced by the averaging filter, and further wherein the processing circuitry is configured to form the final image from the intermediate images in dependence on the sharpness measures.

14. The image recording apparatus of claim 13, wherein the sharpness measures are relatively higher for pixel values in each intermediate image, for pixel positions corresponding to portions of the object that would be in focus were the focal plane positioned at the displacement value corresponding to the intermediate image, and wherein the sharpness measures are relatively lower for pixel values in each intermediate image, for pixel positions corresponding to portions of the object that would be out of focus were the focal plane positioned at the displacement value corresponding to the intermediate image.

15. The image recording apparatus of claim 10, wherein each displacement vector compensates for a shift within the image plane that would be observed for an imaged object that was offset from the focal plane along the optical axis by the displacement value and illuminated using the associated illumination angle.

16. The image recording apparatus of claim 10, wherein the processing circuitry is configured to generate a height map for the object, based on using the sharpness measures of the intermediate images to estimate corresponding heights of different parts of the object.

17. The image recording apparatus of claim 10, wherein the set of displacement values represents an interval along the optical axis that corresponds to a desired depth of field for the final image.

18. The image recording apparatus of claim 10, wherein the fixed position of the focal plane along the optical axis of the image recording apparatus is one among a plurality of fixed positions corresponding to different foci of the image recording apparatus, and wherein the processing circuitry is configured to record a corresponding plurality of individual images for each foci, such that the image recording apparatus obtains a set of intermediate images for each foci using a corresponding set of displacement values relative to the fixed position of the focal plane for each foci, and obtains the final image based on the sets of intermediate images.

* * * * *

UNITED STATES PATENT AND TRADEMARK OFFICE
CERTIFICATE OF CORRECTION

PATENT NO. : 10,755,429 B2
APPLICATION NO. : 15/572349
DATED : August 25, 2020
INVENTOR(S) : L. Stoppe et al.

It is certified that error appears in the above-identified patent and that said Letters Patent is hereby corrected as shown below:

In the Specification

Column 5, Line 35, please change "step 31" to -- step 30 --

Column 5, Line 40, please change "step 31" to -- step 30 --

Signed and Sealed this
Eighth Day of December, 2020

Andrei Iancu
*Director of the United States Patent and Trademark Office*